US008855565B2

(12) United States Patent
Asai et al.

(10) Patent No.: US 8,855,565 B2
(45) Date of Patent: Oct. 7, 2014

(54) TERMINAL DEVICE AND APPLICATION CONTROL METHOD

(75) Inventors: Mao Asai, Chiyoda-ku (JP); Yusuke Nakayama, Chiyoda-ku (JP)

(73) Assignee: NTT DoCoMo, Inc., Tokyo (JP)

( * ) Notice: Subject to any disclaimer, the term of this patent is extended or adjusted under 35 U.S.C. 154(b) by 221 days.

(21) Appl. No.: 13/635,190

(22) PCT Filed: Mar. 22, 2011

(86) PCT No.: PCT/JP2011/056808
§ 371 (c)(1),
(2), (4) Date: Sep. 14, 2012

(87) PCT Pub. No.: WO2011/118570
PCT Pub. Date: Sep. 29, 2011

(65) Prior Publication Data
US 2013/0005267 A1    Jan. 3, 2013

(30) Foreign Application Priority Data

Mar. 26, 2010  (JP) ................ 2010-072987

(51) Int. Cl.
*H04B 7/00* (2006.01)
*H04M 1/60* (2006.01)
*H04R 3/12* (2006.01)
*H04R 1/10* (2006.01)
*H04M 1/725* (2006.01)

(52) U.S. Cl.
CPC ......... *H04M 1/6066* (2013.01); *H04R 2420/03* (2013.01); *H04M 1/72558* (2013.01); *H04M 1/72544* (2013.01); *H04R 3/12* (2013.01); *H04R 2499/11* (2013.01); *H04M 2250/02* (2013.01); *H04R 1/1041* (2013.01); *H04R 2420/07* (2013.01); *H04R 2420/05* (2013.01)
USPC ........................................ 455/41.2; 455/41.3

(58) Field of Classification Search
CPC ......................... H04M 1/7253; H04M 1/6066
USPC .......... 455/41.2, 39, 502, 41.3; 370/517, 519;
348/500, 516
See application file for complete search history.

(56) References Cited

U.S. PATENT DOCUMENTS 8,199,780 B2 *    6/2012  Gha et al. ........... 370/517
2006/0123063 A1 * 6/2006  Ryan et al. .......... 707/201

(Continued)

FOREIGN PATENT DOCUMENTS

JP    2006 121455     5/2006

OTHER PUBLICATIONS

International Preliminary Report on Patentability issued Nov. 1, 2012 in PCT/JP2011/056808 filed Mar. 22, 2011.

(Continued)

*Primary Examiner* — Sonny Trinh
(74) *Attorney, Agent, or Firm* — Oblon, Spivak, McClelland, Maier & Neustadt, L.L.P.

(57) ABSTRACT

A mobile telephone (1) includes a link establishment detection module (18) that detects establishment of a link with Bluetooth headphones (2), an application setting check module (17) that checks whether an application (12) to be started is set to inhibit playback through the Bluetooth headphones (2), a link termination control module (19) that terminates a link with the Bluetooth headphones (2) when establishment of the link with the Bluetooth headphones (2) is detected and setting to inhibit playback through the Bluetooth headphones (2) for the application (12) to be started is recognized, and a speaker control module (20) that switches output of the speaker (16) to mute when a link is terminated by the link termination control module (19).

3 Claims, 3 Drawing Sheets

(56) References Cited

U.S. PATENT DOCUMENTS

2010/0295993 A1* 11/2010 Oh ................................. 348/516
2012/0159527 A1* 6/2012 Perez et al. ..................... 725/10

OTHER PUBLICATIONS

Written Opinion issued Jun. 28, 2011 in PCT/JP2011/056808 filed Mar. 22, 2011.
International Search Report Issued Jun. 28, 2011 in PCT/JP11/56808 Filed Mar. 22, 2011.

* cited by examiner

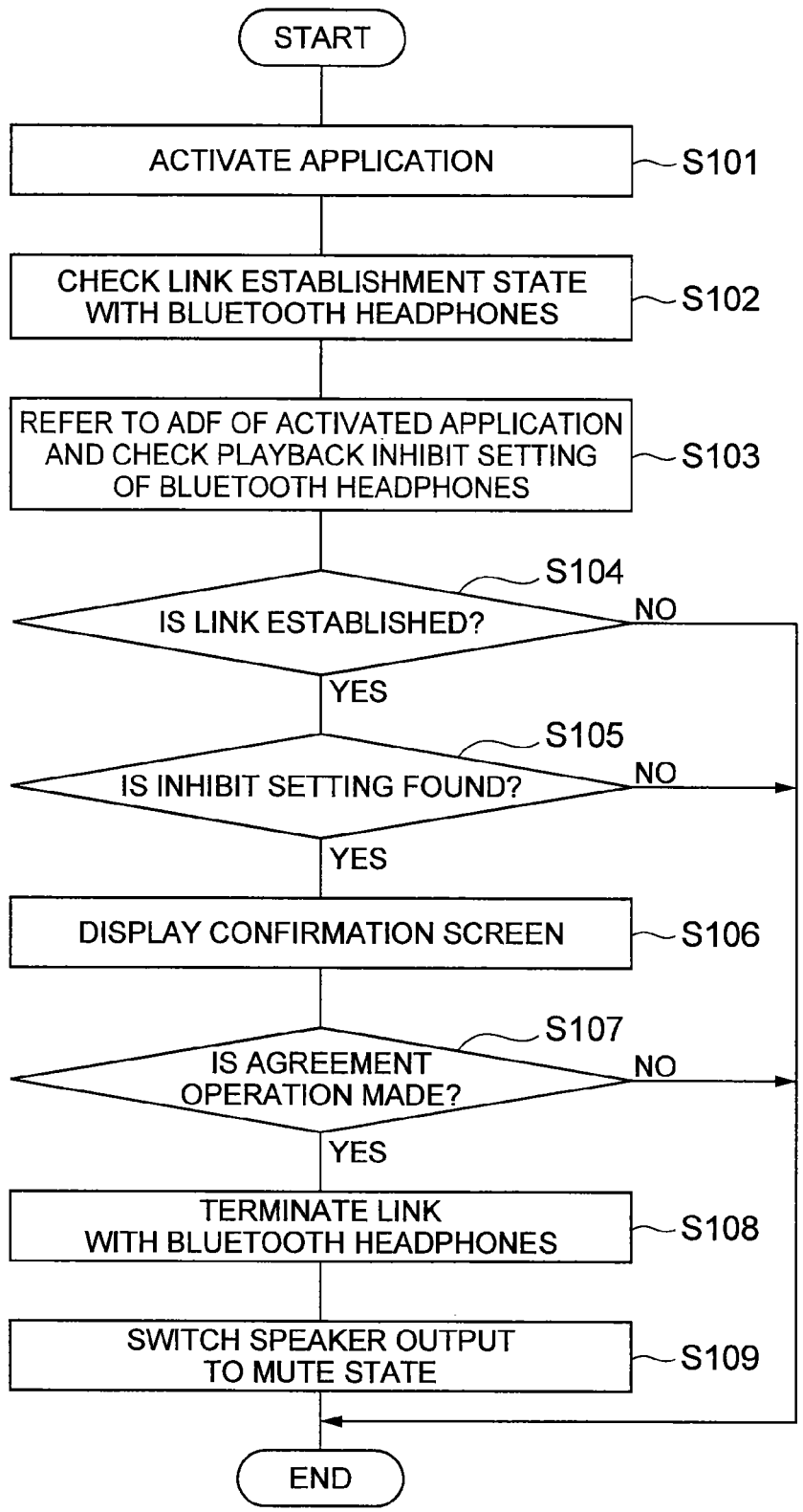

TERMINAL DEVICE AND APPLICATION CONTROL METHOD

TECHNICAL FIELD

The present invention relates to a terminal device and a method of controlling an application of the terminal device.

BACKGROUND ART

A terminal device such as a mobile telephone that supports Bluetooth (registered trademark) feature is known. For example, Patent Literature 1 describes a technique that connects such a terminal device and headphones having Bluetooth communication feature (which is referred to hereinafter as "Bluetooth headphones") via wireless communication and lets stream data such as music from the terminal device play through the Bluetooth headphones.

CITATION LIST

Patent Literature

Patent Literature 1: Japanese Unexamined Patent Application Publication No. 2006-121455

SUMMARY OF INVENTION

Technical Problem

It is known that it typically takes a longer time for the Bluetooth headphones to transfer stream data such as music than wired earphones or speakers. Accordingly, it takes time after stream data starts playing in the terminal data until it is actually output through the headphones, which causes playout delay by the Bluetooth headphones. As a result, a lack of synchronization between a display screen and music can occur when operating an application with use of the Bluetooth headphones.

For example, there is an application in need of synchronization between screen display and sound, such as a game that goes on when operated in accordance with rhythm or music (so-called music game). In such an application, when a lack of synchronization between display and sound occurs due to playout delay on the Bluetooth headphones, it fails to operate as intended by a user, thus causing the user to feel unsatisfactory in the usability of the application.

To address this case, the user of the terminal device can make an operation to stop the output through the Bluetooth headphones. However, it is troublesome and not user-friendliness for the user to make such an operation every time the user uses an application, which leads to a decrease in the convenience of the terminal device and the application.

Further, there is an application for supporting the workout of a user, such as displaying a travel route on a screen during jogging or walking and informing navigation or pace-making by guiding sound at the same time. In such an application, when a lack of synchronization between display and guiding sound occurs due to playout delay on the Bluetooth headphones, it fails to give information at appropriate timing and there is a possibility that proper navigation or pace-making cannot be done. This leads to a decrease in the convenience of the application.

The present invention has been accomplished to solve the above problems and an object of the present invention is thus to provide a terminal device and an application control method that can improve the usability and convenience of an application during use of the Bluetooth headphones.

Solution to Problem

To solve the above problem, a terminal device according to the present invention is a terminal device connectable to Bluetooth headphones and including a speaker, the terminal device including a detection means for detecting establishment of a link with the Bluetooth headphones, a check means for checking whether an application to be started is set to inhibit playback through the Bluetooth headphones, a link termination control means for termining a link with the Bluetooth headphones when establishment of the link with the Bluetooth headphones is detected by the detection means and setting to inhibit playback through the Bluetooth headphones for the application is recognized by the check means, and a switch means for switching output of the speaker to mute when a link is terminated by the link termination control means.

Likewise, to solve the above problem, an application control method according to the present invention is an application control method executed by a terminal device connectable to Bluetooth headphones and including a speaker, the method including a detection step of detecting establishment of a link with the Bluetooth headphones, a check step of checking whether an application to be started is set to inhibit playback through the Bluetooth headphones, a link termination control step of termining a link with the Bluetooth headphones when establishment of the link with the Bluetooth headphones is detected in the detection step and setting to inhibit playback through the Bluetooth headphones for the application is recognized in the check step, and a switch step of switching output of the speaker to mute when a link is terminated in the link termination control step.

According to the terminal device and the application control method described above, in the case of starting the application that is set to inhibit playback through the Bluetooth headphones, a Bluetooth link is terminated so that no sound is output from the Bluetooth headphones. Therefore, even if an application is in need of synchronization between screen display and sound, such as music game and workout support, and it is thus not suitable for use on the Bluetooth headphones, it is possible to avoid a problem in operating the application by use of the Bluetooth headphones and thereby improve the usability.

Further, although the existing technique typically changes the path to the speaker automatically upon termination of a link with the Bluetooth headphones, it can cause sound to be output from the speaker against the intent of a user, which raises a problem in terms of public manner. To address this issue, according to the invention, the output of the speaker is muted first of all when a link with the Bluetooth headphones is terminated, and it is thereby possible to prevent sound from being output against the user's intent and thereby improve the convenience of the application.

Further, it is preferred that the link termination control means notifies a user of the terminal device that the application is not available on the Bluetooth headphones and, when an agreement operation by the user is detected, terminates a link with the Bluetooth headphones.

It is thus possible to determine whether or not to abandon the use of the Bluetooth headphones in complying with the intent of a user of the terminal device and thereby improve the user-friendliness of the terminal device and the application.

Advantageous Effects of Invention

The terminal device according to the invention can improve the usability and convenience of an application during use of the Bluetooth headphones.

BRIEF DESCRIPTION OF DRAWINGS

FIG. 3 is a flowchart showing a process executed in a mobile telephone 1 according to the embodiment.

DESCRIPTION OF EMBODIMENTS

Embodiments of the present invention will be described hereinafter in detail with reference to the drawings. It is noted that in the description of the drawings, the same or equivalent elements will be denoted by the same reference symbols and redundant description will be omitted.

Figure 1:
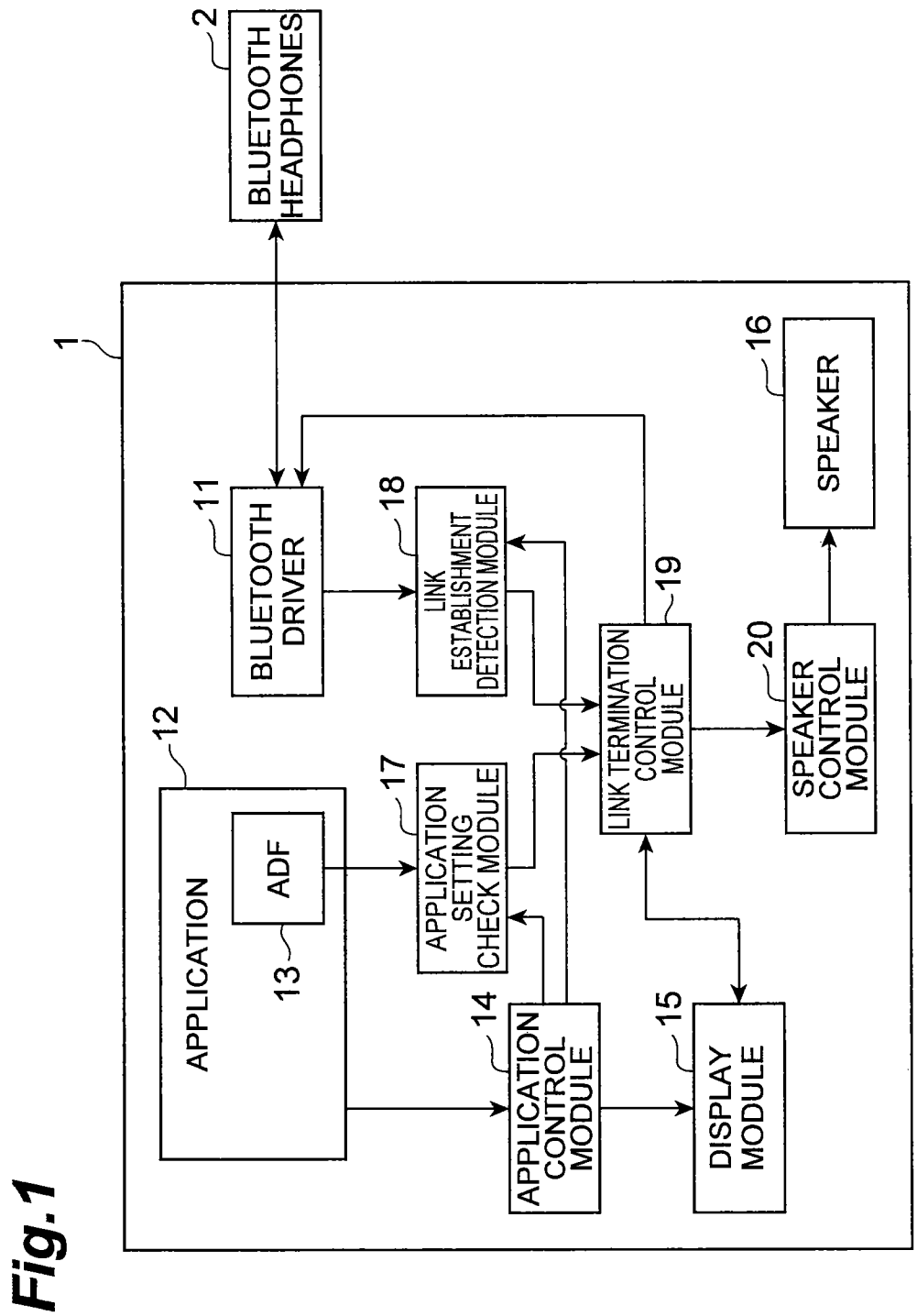
FIG. 1 is a functional block diagram of a terminal device (mobile telephone) according to one embodiment of the invention.

FIG. 1 is a functional block diagram of a mobile telephone 1 as an example of a terminal device according to one embodiment of the invention. The mobile telephone 1 according to this embodiment has a wireless communication feature over a mobile network, wireless LAN network or the like and further has a short-range wireless communication feature through Bluetooth technology.

The mobile telephone 1 includes a Bluetooth driver 11 and can thereby establish a link with an external device with Bluetooth feature and make a connection for communication. In this embodiment, the mobile telephone 1 is connected to be able to perform short-range wireless communication with the Bluetooth headphones 2 via the Bluetooth driver 11.

Further, the mobile telephone 1 stores one or a plurality of applications 12 in a storage means (not shown) such as memory. In this embodiment, the application 12 is a Java (registered trademark) application that contains a configuration file, which is an ADF (Application Descripter File) 13, that describes information such as the size, download source URL and updated date and time of each application. Then, when an application control module 14 of the mobile telephone 1 starts the application 12, the screen of the application is displayed on a display module 15 (a display 105 in FIG. 2) and simultaneously the sound of the application is output through the Bluetooth headphones or speaker for presentation to a user. Note that, when a link with the Bluetooth headphones 2 is not established, the mobile telephone 1 can automatically switch the output path to a speaker 16.

Further, in this embodiment, the mobile telephone 1 particularly includes an application setting check module (check means) 17, a link establishment detection module (detection means) 18, a link termination control module (link termination control means) 19, and a speaker control module (switch means) 20, as shown in FIG. 1.

The application setting check module 17 checks whether the application 12 to be started is set to inhibit playback of sound through the Bluetooth headphones 2. Specifically, this setting is preferably made by setting a flag indicating inhibition of playback through the Bluetooth headphones 2 in the ADF 13 of each application 12. The application setting check module 17 refers to the ADF 13 for the application 12 to be started to check the presence or absence of a playback inhibit flag and, when the playback inhibit flag is described in the ADF 13, determines that playback of sound through the Bluetooth headphones 2 is inhibited.

Note that the application that is set to inhibit playback of sound through the Bluetooth headphones by the ADF 13 is an application in need of synchronization between screen display and sound, such as a workout support that displays a travel route on a screen during jogging or walking and concurrently informs navigation or pace-making by guiding sound, or a game that goes on when operated in accordance with rhythm or music (so-called music game).

The link establishment detection module 18 detects the establishment of a link with the Bluetooth headphones 2. Specifically, the link establishment detection module 18 acquires information indicating whether a link with the Bluetooth headphones 2 is established or not from the Bluetooth driver 11 and detects the link establishment state with the Bluetooth headphones 2.

The link termination control module 19 determines whether or not to terminate a link with the Bluetooth headphones 2 based on the information acquired from the application setting check module 17 and the link establishment detection module 18. Specifically, the link termination control module 19 determines to terminate a link with the Bluetooth headphones 2 when the link establishment detection module 18 has detected the establishment of the link with the Bluetooth headphones 2 and the application setting check module 17 has recognized that the application 12 is set to inhibit playback of sound through the Bluetooth headphones 2.

When the link termination control module 19 has determined to terminate a link, it causes the display module 15 to display a confirmation screen upon startup of the application. The confirmation screen notifies a user of the mobile telephone 1 that the application 12 to be started is an application that is not available on the Bluetooth headphones 2 and prompts the user to agree to abandon the use of the Bluetooth headphones 2. When the agreement of a user is detected through an operation module 104 by receiving an input operation such as pressing a button in response to the confirmation screen, the link termination control module 19 transmits a control instruction to terminate a link with the Bluetooth headphones 2 to the Bluetooth driver 11. Further, the link termination control module 19 transmits information indicating the determination to terminate a link with the Bluetooth headphones 2 to the speaker control module 20.

The speaker control module 20 makes the output of the speaker 16 enter the mute state when the link termination control module 19 determines to terminate a link with the Bluetooth headphones 2.

Figure 2:
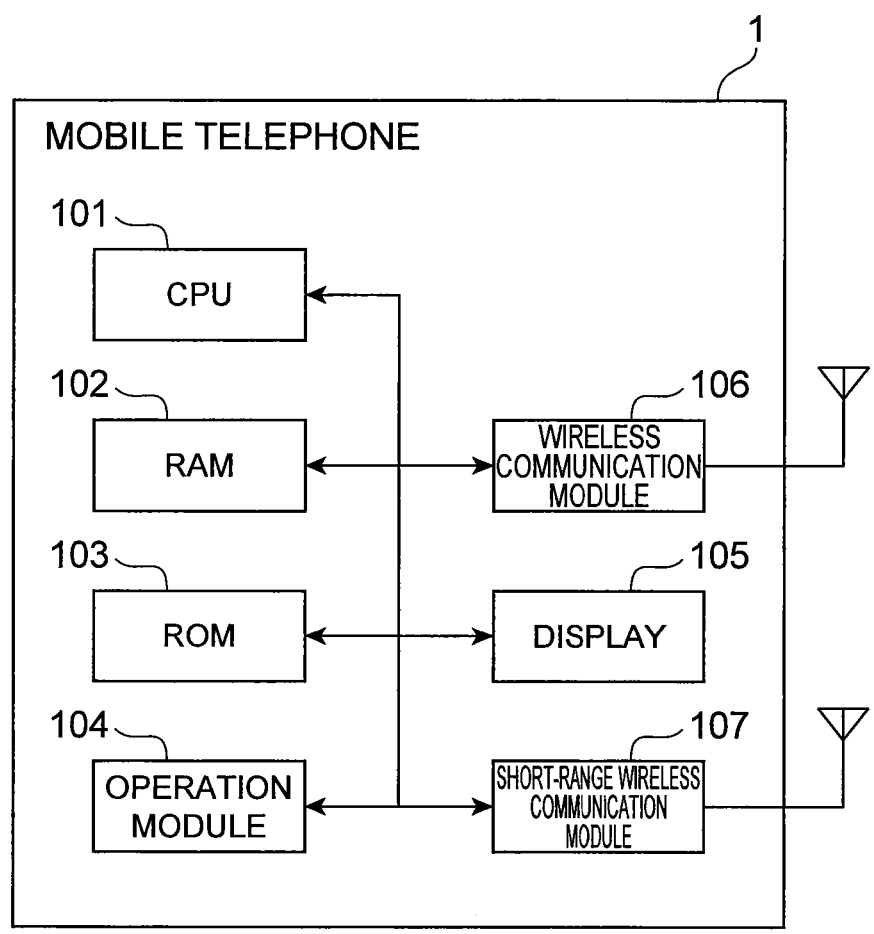
FIG. 2 is a hardware configuration diagram of a mobile telephone according to the embodiment.

FIG. 2 is a hardware configuration diagram of the mobile telephone 1. As shown in FIG. 2, the mobile telephone 1 is physically configured as a terminal device that includes a CPU (Central Processing Unit) 101, RAM (Random Access Memory) 102 and ROM (Read Only Memory) 103 serving as a main memory device, an operation module 104 such as an input key serving as an input device, a display 105, a wireless communication module 106, a short-range wireless communication module 107 that makes wireless communication in compliance with Bluetooth standards and the like. The functions of the mobile telephone 1 shown in FIG. 1 are implemented by loading given computer software onto hardware such as the CPU 101 or the RAM 102, making the operation module 104, the display 105, the wireless communication module 106 and the short-range wireless communication module 107 operate under control of the CPU 101, and performing reading and writing of data in the RAM 102 or the ROM 103.

A process executed in the mobile telephone 1 according to this embodiment is described and an application control method according to this embodiment also described hereinafter with reference to the flowchart of FIG. 3. FIG. 3 is a flowchart showing a process executed in the mobile telephone 1 according to this embodiment.

When the activation of any application 12 in the mobile telephone 1 is started by the application control module 14 (S101), the link establishment detection module 18 checks the link establishment state with the Bluetooth headphones 2 (S102: detection step). The link establishment detection module 18 makes an inquiry about the current link establishment state with the Bluetooth headphones 2 to the Bluetooth driver 11 and acquires information about the link establishment state. Then, the link establishment detection module 18 transmits the acquired information to the link termination control module 19.

Then, the application setting check module 17 checks whether the application activated in Step S101 is set to inhibit playback through the Bluetooth headphones or not (S103: check step). Specifically, the application setting check module 17 refers to the ADF 13 for the activated application and, when a flag indicating playback inhibit setting is described in the ADF 13, determines that playback through the Bluetooth headphones is inhibited. The application setting check module 17 transmits information indicating the playback inhibit setting to the link termination control module 19.

After that, the link termination control module 19 analyzes the information transmitted from the application setting check module 17 and the link establishment detection module 18. Specifically, it is determined whether a link with the Bluetooth headphones is established or not (S104) and further determined whether playback through the Bluetooth headphones is inhibited for the activated application or not (S105). Then, only when a link with the Bluetooth headphones is established (YES in S104) and playback through the Bluetooth headphones is inhibited for the activated application (YES in S105), the process proceeds to Step S106. Otherwise, the process ends.

When the above-described conditions are satisfied in Steps S104 and S105, the link termination control module 19 causes the display module 15 to display a confirmation screen upon startup of the application (S106). The confirmation screen notifies a user of the mobile telephone 1 that the application 12 to be started is an application that is not available on the Bluetooth headphones 2 and prompts the user to agree to abandon the use of the Bluetooth headphones 2. Then, it is checked whether the user's agreement operation in response to the confirmation screen is detected (S107). When the user's agreement operation is detected, the process proceeds to Step S108. When, on the other hand, the user's agreement operation is not detected for a predetermined length of time, for example, or an operation indicating disagreement or the like is detected, the process ends.

When the user's agreement operation is detected in S106, the link termination control module 19 terminates a link with the Bluetooth headphones (S108: link termination control step). The link termination control module 19 transmits a control instruction to terminate a link with the Bluetooth headphones 2 to the Bluetooth driver 11 and further transmits information indicating the determination to terminate a link with the Bluetooth headphones 2 to the speaker control module 20.

Then, the speaker control module 20 switches the speaker output into the mute state (S109: switch step), and the process ends.

As described above, in this embodiment, when a link with the Bluetooth headphones is established and playback through the Bluetooth headphones is inhibited for the activated application, the application is started on condition that the Bluetooth headphones and the speaker are both controlled not to output any sound.

Note that the above-described Steps S102 and S103 may be performed in different order. The same applies to Steps S104 and S105.

As described above, in the mobile telephone 1 according to this embodiment, upon startup of an application, the link establishment detection module 18 detects the establishment of a link with the Bluetooth headphones 2, and the application setting check module 17 checks whether the application 12 to be started is set to inhibit playback through the Bluetooth headphones 2. Then, when the link establishment detection module 18 has detected the establishment of a link with the Bluetooth headphones 2 and the application setting check module 17 has recognized that the application 12 is set to inhibit playback through the Bluetooth headphones 2, the link termination control module 19 terminates a link with the Bluetooth headphones 2. Further, when the link is terminated by the link termination control module 19, the speaker control module 20 mutes the output of the speaker 16.

In this mobile telephone 1, in the case of starting the application 12 that is set to inhibit playback through the Bluetooth headphones 2, a Bluetooth link is terminated so that no sound is output from the Bluetooth headphones 2. Therefore, even if an application is in need of synchronization between screen display and sound, such as music game and workout support, and it is thus not suitable for use on the Bluetooth headphones 2, it is possible to avoid a problem in operating the application by use of the Bluetooth headphones 2 and thereby improve the usability.

Further, although the existing technique typically changes the path to the speaker 16 automatically upon termination of a link with the Bluetooth headphones 2, it can cause sound to be output from the speaker 16 against the intent of a user, which raises a problem in terms of public manner. To address this issue, in the mobile telephone 1 according to this embodiment, the output of the speaker 16 is muted first of all when a link with the Bluetooth headphones 2 is terminated, and it is thereby possible to prevent sound from being output against the user's intent and thereby improve the convenience of the application.

Further, the link termination control module 19 presents a user of the mobile telephone 1 that the application 12 is not available on the Bluetooth headphones 2 and, upon detection of the user's agreement, terminates a link with the Bluetooth headphones 2.

It is thus possible to determine whether or not to abandon the use of the Bluetooth headphones 2 in complying with the intent of a user of the mobile telephone 1 and thereby improve the user-friendliness of the mobile telephone 1 and the application 12.

Although preferred embodiments of the terminal device and the application control method according to the present invention are described above, the present invention is not limited to the above-described embodiments. For example, although the mobile telephone 1 is taken as an example of the terminal device in the above-described embodiment, it is applicable to other types of terminal devices that support Bluetooth feature, such as a PDA (Personal Digital Assistant), personal computer and portable music player.

INDUSTRIAL APPLICABILITY

The present invention provides a terminal device and an application control method that can improve the usability and convenience of an application during use of Bluetooth headphones.

REFERENCE SIGNS LIST

1 ... mobile telephone (terminal device), 2 ... Bluetooth headphones, 12 ... application, 16 ... speaker, 17 ... application setting check module (check means), 18 ... link establishment detection module (detection means), 19 ... link termination control module (link termination control means), 20 ... speaker control module (switch means)

The invention claimed is:

1. A terminal device connectable to Bluetooth headphones and including a speaker, comprising:
    a detection means for detecting establishment of a link with the Bluetooth headphones;
    a check means for checking whether an application to be started is set to inhibit playback through the Bluetooth headphones;
    a link termination control means for termining a link with the Bluetooth headphones when establishment of the link with the Bluetooth headphones is detected by the detection means and setting to inhibit playback through the Bluetooth headphones for the application is recognized by the check means; and
    a switch means for switching output of the speaker to mute when a link is terminated by the link termination control means.

2. The terminal device according to claim 1, wherein
    the link termination control means notifies a user of the terminal device that the application is not available on the Bluetooth headphones and, when an agreement operation by the user is detected, terminates a link with the Bluetooth headphones.

3. An application control method executed by a terminal device connectable to Bluetooth headphones and including a speaker, comprising:
    a detection step of detecting establishment of a link with the Bluetooth headphones;
    a check step of checking whether an application to be started is set to inhibit playback through the Bluetooth headphones;
    a link termination control step of termining a link with the Bluetooth headphones when establishment of the link with the Bluetooth headphones is detected in the detection step and setting to inhibit playback through the Bluetooth headphones for the application is recognized in the check step; and
    a switch step of switching output of the speaker to mute when a link is terminated in the link termination control step.

* * * * *